Sept. 25, 1945.  I. HAKKI  2,385,440
AUXILIARY ELECTRODE SUPPORT
Filed June 9, 1944
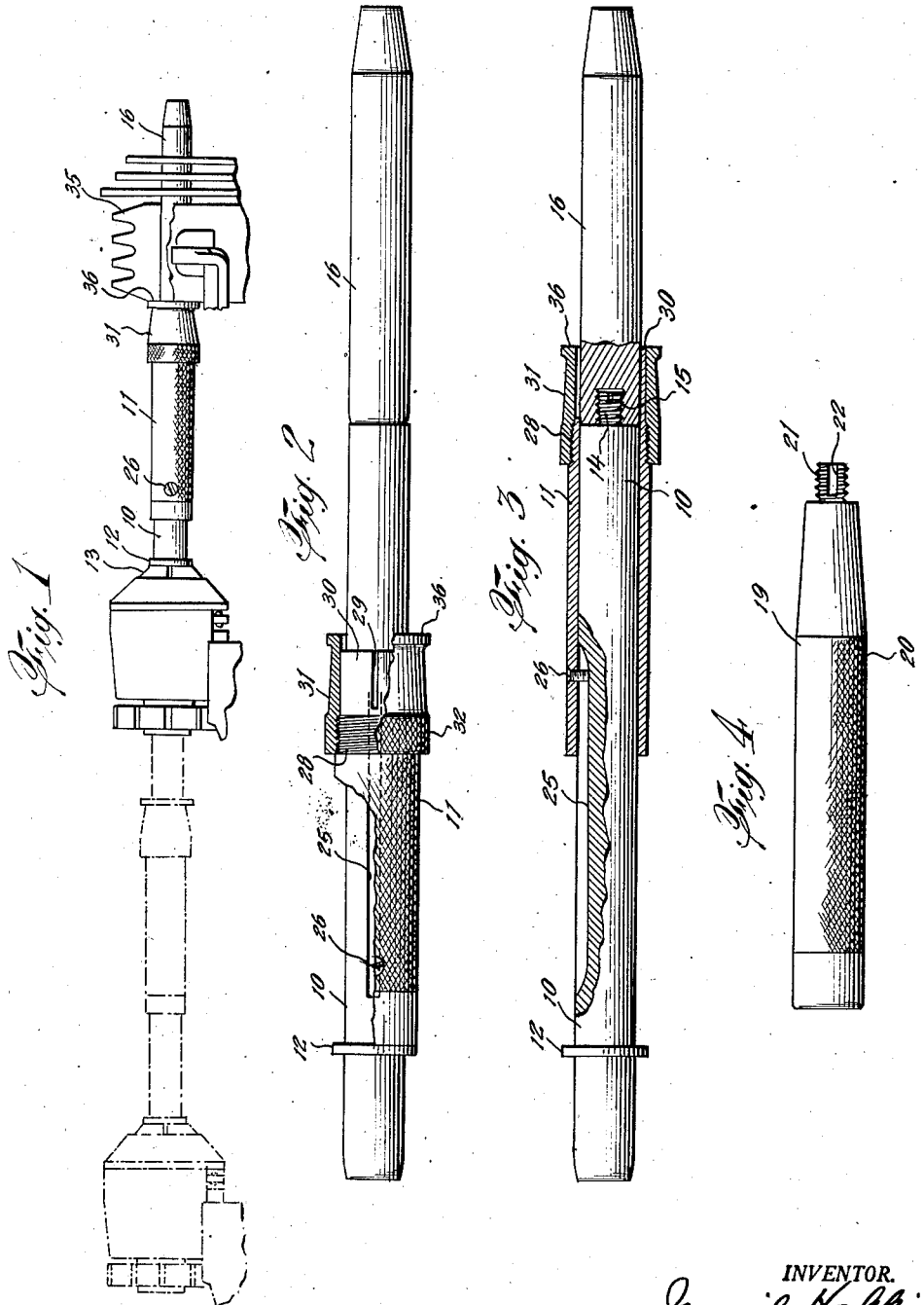
INVENTOR.
Ismail Hakki
BY John P. Chandler
his Attorney Patented Sept. 25, 1945

2,385,440

UNITED STATES PATENT OFFICE 2,385,440

AUXILIARY ELECTRODE SUPPORT

Ismail Hakki, New York, N. Y.

Application June 9, 1944, Serial No. 539,511

4 Claims. (Cl. 176—119)

This invention relates to electrode supports, and relates more particularly to an improved supporting means for the positive carbon electrode normally used in connection with motion picture projection machines and the like.

In devices of this general character, the positive electrode is consumed somewhat more rapidly than is the negative one, and in order to get approved results, the electrode must be constantly rotated at a relatively low speed. The forward end of the electrode passes through a contact member, and the arrangement is such that a fair-sized length of the carbon must be discarded in every instance. The device of the present invention is in the nature of an auxiliary electrode support which permits the use of relatively short lengths of carbon which have heretofore in all instances been necessary to be discarded.

The device consists essentially of a shank which is received in the usual chuck associated with the carriage for the positive electrode. The shank carries a sleeve which is movable longitudinally of the shank within limits defined by a pin in one of the elements which is received within a longitudinal recess in the other element of fixed length. The short positive electrode is suitably mounted at the forward end of the shank, and in this starting position, the slidable sleeve receives and supports the carbon electrode, such support being auxiliary to the support afforded by the shank. As the front end of the sleeve moves forward and eventually engages the positive contact element, the electrode may nevertheless be driven forward, revolving as before, and as this forward movement continues, the sleeve is moved further rearwardly on the shank. During this rearward movement, it eventually reaches a position where it no longer furnishes support for the electrode, although none is necessary, for the reason that in this position the electrode is amply supported by the walls of the bore in the positive contact.

In this fashion, the forward end of the shank upon which the electrode is mounted may move into the positive contact, since the diameter of the shank is of the same size as the electrode, and may thus utilize substantially the entire piece of carbon. The saving in cost of operation occasioned by the present device is very considerable, as will be appreciated by those skilled in the art. The device of the present invention is simple and inexpensive in construction, and possesses no parts which are likely to get out of order.

In the drawing:

Fig. 1 is a side elevation of the device of the present invention, the view showing the operating position of such device.

Fig. 2 is a side elevation of the complete device, showing certain details of construction.

Fig. 3 is a broken side elevation, partially in section, of the device, the view being taken at right angles to that shown in Fig. 2.

Fig. 4 is a side elevation of the tap used for cutting the thread in the apertured electrode.

Referring now more particularly to the drawing, the device of the present invention includes a shank 10, which carries a longitudinally-movable sleeve 11, and an annular collar 12 which may be force-fitted on the shank, or may be formed integrally therewith. Collar 12 limits inward movement of the shank in the supporting chuck 13. At its forward end, shank 10 supports a threaded screw 14, such screw being received in a threaded opening 15 formed in the relatively short length of the carbon electrode 16.

Threaded opening 15 may be formed in the electrode by merely drilling an aperture of appropriate size in the rear terminal wall of the electrode, and then employing a tool, such as is shown in Fig. 4, for tapping the hole. This tool includes a handle element 19 which may be knurled, as shown at 20, and the tapping member 21 formed with a plurality of spaced, longitudinal slots 22 forming thread-cutting edges. After the thread has been cut in aperture 15 in the electrode, it may be screwed onto screw 14 until the rear terminal of such electrode is in firm engagement with the forward face of shank 10. It will be noted that shank 10 is of the same diameter as that of electrode 16.

Shank 10 further includes a longitudinal slot 25 which receives a set screw 26 carried by sleeve 11, such slot providing means for limiting longitudinal movement of sleeve 11 relative to shank 10. Adjacent to its forward end, sleeve 11 is threaded, as shown at 28, and in advance of this threaded portion, the sleeve is provided with a plurality of spaced, longitudinal slots 29 extending inwardly from the forward end of the sleeve, thus forming a plurality of spaced, segmental jaw members 30. These jaw members may be set inwardly a slight distance, and, accordingly, when the sleeve is in its forward position, shown in Fig. 3, these inwardly-set jaw members grasp the sides of the carbon electrode. Threaded portion 28 of sleeve 11 carries a bushing 31, which may be knurled, as shown at 32, just as the external surface of sleeve 11 may also be knurled.

The operation of the device is as follows. The short length 16 of the carbon electrode is drilled and tapped in the manner described. It is then mounted in the forward end of shank 10, as shown in Fig. 2, and sleeve 11 carrying bushing 31 is then moved forwardly, thus causing segmental jaw members 30 to grasp the side walls of the electrode adjacent to its rear end. This prevents sleeve 11 and bushing 31 from being too freely slidable rearwardly on shank 10, and also gives additional support to the electrode. The rear end of shank 10 is now mounted in chuck 13, and the forward end of the electrode 16 moves through the stationary contact member 35 which is a part of the projection machine. The projection machine may now be operated, and the electrode rotated and fed forwardly in the usual manner.

As soon as the forward face 36 of bushing 31 engages the rear face of the contact member 35, forward movement of sleeve 11 and bushing 31 ceases, although shank 10 has moved forwardly, as before. This action tends to move bushing 31 and sleeve 11 progressively rearwardly on shank 10, which movement continues as the electrode is moved forwardly. Operation may thus continue until sleeve 11 has been moved rearwardly almost to a point wherein its rear terminal contacts collar 12, as shown in Fig. 2, at which time operation will be discontinued and a new electrode inserted.

While one form or embodiment of the invention has been shown and described herein for illustrative purposes, and the construction and arrangement incidental to a specific application thereof have been disclosed and discussed in detail, it is to be understood that the invention is limited neither to the mere details or relative arrangement of parts, nor to its specific embodiment shown herein, but that extensive deviations from the illustrated form or embodiment of the invention may be made, without departing from the principles thereof.

What I claim is:

1. An auxiliary support for the positive electrode of a motion picture projector having a chuck and a positive contact member, such support comprising an elongated shank which is received at its rear end in the electrode chuck, means at the forward end of the shank for supporting the electrode in axial alignment therewith, a sleeve carried by the shank and being longitudinally movable thereof, the forward end of the sleeve having a plurality of spaced, longitudinal slots forming resilient jaw members which grasp and support the terminal portion of the electrode when such sleeve is in its forward position on the shank, and means carried by the sleeve contacting the positive contact member during forward movement of the electrode, causing the sleeve to move rearwardly and out of electrode-supporting relation.

2. An electrode support of the character described comprising an elongated shank, means at the forward end of the shank for supporting the electrode in axial alignment with the shank, and a sleeve carried by the shank and being longitudinally movable thereof, the forward end of the sleeve having a plurality of spaced, longitudinal slots forming jaw members which are inwardly set to grasp and support the terminal portion of the electrode when such sleeve is in its forward position on the shank.

3. An auxiliary support for the positive electrode of a motion picture projector having a chuck and a positive contact member, such support comprising an elongated shank which is received at its rear end in the electrode chuck, means at the forward end of the shank for supporting the electrode in axial alignment with said shank, comprising a threaded pin which is received within a threaded aperture at the rear end of the electrode, a sleeve carried by the shank and being longitudinally movable thereof, means for limiting such movement, the forward end of the sleeve having a plurality of spaced, longitudinal slots forming jaw members which are inwardly set to grasp and provide additional support for the terminal portion of the electrode when such sleeve is in its forward position on the shank, and a bushing carried at the forward end of the sleeve, such bushing contacting the positive contact member during forward movement of the electrode, causing the sleeve to move rearwardly and out of electrode-supporting relation.

4. An auxiliary support for the positive electrode of a motion picture projector having a chuck and a positive contact member, such support comprising an elongated shank which is received at its rear end in the electrode chuck, means at the forward end of the shank for supporting the electrode in axial alignment with the shank, comprising a pin which is received within a longitudinal bore extending inwardly from the rear end of the electrode, a sleeve carried by the shank and being longitudinally movable thereof, means for limiting movement of the sleeve relative to the shank, such means comprising a pin carried by the sleeve, the shank having an elongated recess securing the pin, a plurality of inwardly-set jaw members formed at the forward end of the shank which grasp and support the terminal portion of the electrode when such sleeve is in its forward position on the shank, and a bushing carried at the forward end of the sleeve, such bushing contacting the positive contact member during forward movement of the electrode, causing the sleeve to move rearwardly and out of electrode-supporting relation.

ISMAIL HAKKI.